UNITED STATES PATENT OFFICE.

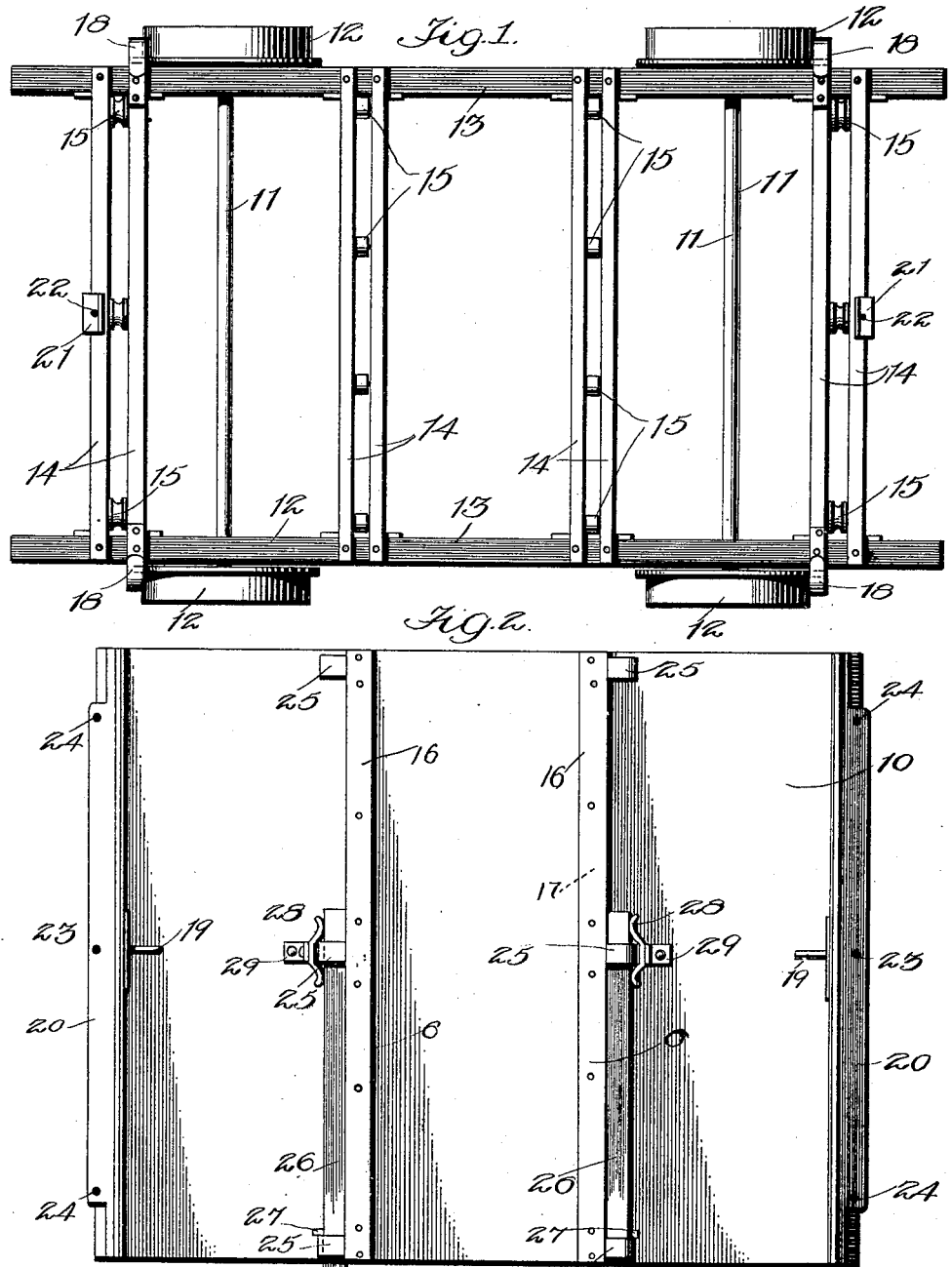
J. G. MEREDITH.
SIDE DUMPING HAND CAR.
APPLICATION FILED MAR. 12, 1919.
1,319,300.
Patented Oct. 21, 1919.
2 SHEETS—SHEET 1.
INVENTOR
JAMES G. MEREDITH, J. G. MEREDITH.
SIDE DUMPING HAND CAR.
APPLICATION FILED MAR. 12, 1919.
1,319,300.
Patented Oct. 21, 1919.
2 SHEETS—SHEET 2.
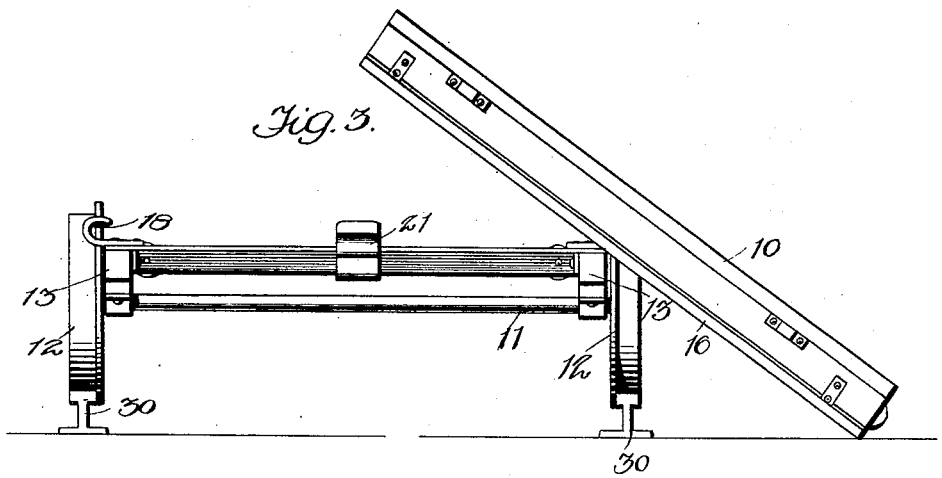
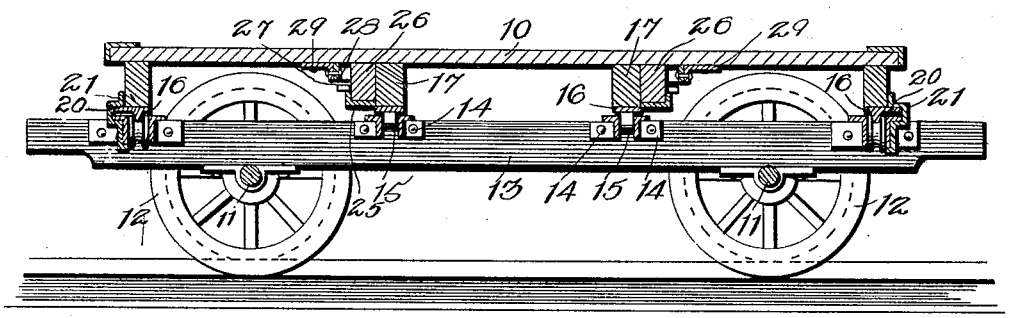
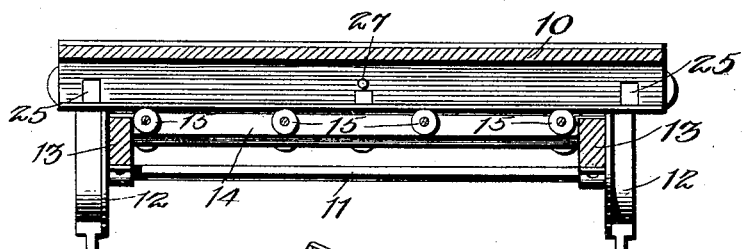
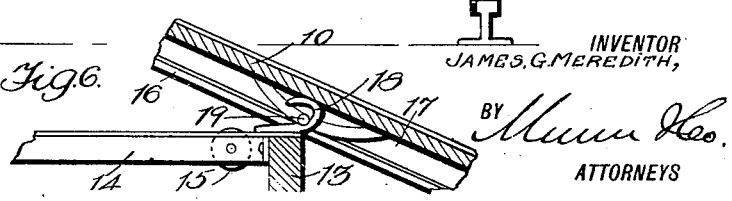
WITNESSES
INVENTOR
JAMES G. MEREDITH,
BY
ATTORNEYS though no less in cross section, and being therefore adapted for disposition within the confines of the spring 28 of the central bracket 25 in the normal position of the beams 26, such beams being adapted to be shifted laterally for projection of their ends beyond either side of the platform 10 as seen in dotted lines of Figs. 2 and 4 to act as handles for tilting the platform to dumping position.

JAMES G. MEREDITH, OF LYNCHBURG, VIRGINIA.

SIDE-DUMPING HAND-CAR.

1,319,300.  Specification of Letters Patent.  Patented Oct. 21, 1919.

Application filed March 12, 1919. Serial No. 282,086.

*To all whom it may concern:*

Be it known that I, JAMES GUSTAVUS MEREDITH, a citizen of the United States, and a resident of Lynchburg, in the county of Campbell and State of Virginia, have made certain new and useful Improvements in Side-Dumping Hand-Cars, of which the following is a specification.

My present invention relates generally to hand cars and more particularly to a side dumping hand car of the type described and claimed in my Patent No. 1230005, dated June 12, 1917, the object of my present improvements being to provide certain means in connection with a laterally shiftable platform of cars of this character to act either as handles for assistance in the dumping of the platforms or as supports for the lowermost side of the platform in dumped position where the ground is low.

A further object is to simplify various connections and in this way improve the construction as a whole.

In the accompanying drawings forming a part of this specification and illustrating my present invention:—

Figure 1 is a top plan view of the truck;

Fig. 2 is a bottom plan view of the platform with its laterally shiftable beams in extended position at one side;

Fig. 3 is an end view showing the platform in dumped position;

Fig. 4 is a vertical longitudinal section;

Fig. 5 is a vertical transverse section, and,

Fig. 6 is a detailed section showing dumping connections.

Referring now to these figures, my invention has to do with a hand car, the platform 10 of which is separable from and laterally shiftable with respect to the truck, the latter of which has wheel axles 11, and wheels 12, the bearings of which are supported by longitudinal side sills 13 between which pairs of parallel transverse bars 14 are extended. These bars 14 support rollers 15, and upon these rollers the lower bearing strips 16 of transverse cleats 17 secured to the lower surface of the platform 10 travel, certain of the bars 14 adjacent the relatively opposite ends of the truck terminating in upwardly and inwardly bent hooks 18 for a purpose which will be presently described.

The platform 10 is provided with inwardly projecting pins 19 at its opposite ends and centrally between its sides, which are adapted for engagement with the hooks 18 upon lateral shifting movement of the platform on the rollers 15 toward either side of the truck, so that when the pins are engaged with the hooks as seen in Fig. 6 for instance, the platform may be tilted to dump its load at the respective side of the truck.

In its normal position, and until it is shifted laterally to engage its pins 19 with the hooks 18 at either side of the truck, the platform 10 is held against tilting movement by virtue of the extended flanges 20 of its bearing strips 16 at its opposite ends, which flanges 20 are terminated at their ends in spaced relation to the sides of the platform 10.

In the normal position of the platform 10 the flanges 20 extend beneath the angular upper portions of brackets 21 secured to certain of the transverse bars 14 of the truck centrally between the side sills 13 as clearly seen by reference to Figs. 1 and 3, and it is thus obvious that when the platform is shifted laterally toward either side to engage its pins 19 within the hooks 18, the opposite ends of the flanges 20 will clear the brackets 21 so that the platform may be tilted, the engaged pins 19 and hooks 18 acting as a hinge.

It will also be noted by reference to Figs. 1 and 2 that the brackets 21 have vertical openings 22 with which central apertures 23 as well as end apertures 24 of the flanges 20 are adapted for alinement. When alined these openings 22, 23 and 24 may receive locking pins so that the platform 10 may in this way be secured either in the normal position shown in Fig. 5, or in laterally extended position at either side, as desired.

The two central cleats 17 extending transversely across the lower surface of the platform 10, as particularly seen in Figs. 2 and 4, have outwardly extending side brackets 25, which slidably receive parallel beams 26 of similar length to the cleats, each of these beams 26 having a central outwardly projecting pin 27, and being engaged by a bowshaped spring 28 carried by a bracket 29 depending from the platform 10, the spring 28 being disposed adjacent to the central bracket 25 of each beam, the latter of which has an angular extremity which, as seen in Fig. 5, is somewhat shorter than the angular extremities of the two end brackets or guides 25, so as to admit of passage of pins 27 thereby. These pins 27 are so disposed as to engage either of the end brackets 25 whose angular extremities are somewhat longer so as to thus hold the beams 26 in laterally extended position at either side of the platform 10 and at the same time prevent complete removal of the said beams.

The springs 28 normally hold the beams 26 against accidental displacement through their frictional engagement therewith, and thus positive movement of the beams is required to shift the same laterally beyond either side of the platform to act either as handles for elevating one side of the platform in tilting the same to dumping position, or as supports for the lower side of the dumped platform where the ground is very low at the respective side of the tracks 30, on which the truck wheels 12 travel.

It is thus obvious that my invention provides certain definite and much to be desired improvements over my previous patent above referred to, as to both the supply of a new feature having an important function and the betterment of other features tending toward greater simplicity, more economical production and more efficient use.

I claim:—

1. A dumping hand car comprising a wheel frame having side members and hooks adjacent to the said side members, a platform having inwardly projecting pins centrally between the sides thereof, said platform being laterally shiftable with respect to the frame or truck to bring its pins into engagement with the said hooks, said frame or truck having end brackets intermediate the side edges thereof and said platform having flanged portions along its opposite ends to extend beneath the brackets, which flanged portions are terminated in spaced relation to the sides of the platform so as to clear the brackets when the said pins of the platform are in engagement with the hooks of the frame or truck, said brackets of the frame or truck and said flanged portions of the platform having openings arranged to aline with one another in normal and laterally extended portions of the platform, for the purpose described.

2. A dumping hand car comprising a wheeled frame, a laterally shiftable platform carried by the frame and tiltable at opposite sides of the frame, and beams carried by the platform and having limited sliding movement with respect thereto and beyond opposite sides thereof.

3. A dumping hand car comprising a wheeled frame, a laterally shiftable platform carried by the frame and having transverse cleats upon its lower surface, guides supported by the said cleats, said platform being laterally shiftable with respect to the frame and tiltable at opposite sides of the frame, and means supported in the said guides and having limited movement therein beyond opposite sides of the platform for the purpose described.

4. A dumping hand car comprising a wheeled frame, a laterally shiftable platform carried by the frame and tiltable at opposite sides of the frame, said platform having lower transverse cleats provided with central and end guides, beams slidable in the said guides for shifting movement beyond opposite sides of the platform, and pins carried by and projecting from the said beams, said pins being movable past central guides of the cleats and being engageable with the end guides thereof to prevent complete withdrawal of the beams as described.

JAMES G. MEREDITH.

Copies of this patent may be obtained for five cents each, by addressing the "Commissioner of Patents, Washington, D. C."